US011014339B2

(12) United States Patent
Yamaguchi et al.

(10) Patent No.: US 11,014,339 B2
(45) Date of Patent: May 25, 2021

(54) INTERMEDIATE FILM FOR LAMINATED GLASS, METHOD FOR MANUFACTURING INTERMEDIATE FILM FOR LAMINATED GLASS, AND LAMINATED GLASS (71) Applicant: SEKISUI CHEMICAL CO., LTD., Osaka (JP)

(72) Inventors: Kouhei Yamaguchi, Kouka (JP); Ryuta Tsunoda, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 486 days.

(21) Appl. No.: 15/125,555

(22) PCT Filed: Mar. 31, 2015

(86) PCT No.: PCT/JP2015/060212
§ 371 (c)(1),
(2) Date: Sep. 12, 2016

(87) PCT Pub. No.: WO2015/152275
PCT Pub. Date: Oct. 8, 2015

(65) Prior Publication Data
US 2017/0001416 A1    Jan. 5, 2017

(30) Foreign Application Priority Data

Mar. 31, 2014   (JP) .............................. JP2014-074517

(51) Int. Cl.
*B32B 17/10* (2006.01)
*C08K 5/098* (2006.01)
(Continued)

(52) U.S. Cl.
CPC .... *B32B 17/1055* (2013.01); *B32B 17/10036* (2013.01); *B32B 17/10688* (2013.01);
(Continued)

(58) Field of Classification Search
CPC .......... B32B 17/1055; B32B 17/10036; B32B 17/10761; B32B 17/10688; B32B 27/306;
(Continued)

(56) References Cited

U.S. PATENT DOCUMENTS 6,372,352 B1    4/2002  Bletsos et al.
6,383,647 B1    5/2002  Shohi et al.
(Continued)

FOREIGN PATENT DOCUMENTS

CN    101006023 A    7/2007
CN    101784386 A    7/2010
(Continued)

OTHER PUBLICATIONS

Shimokawa, Minoru, JP-2006297728-A, Nov. 2, 2006 (Marchine translation) (Year: 2006).*
(Continued)

*Primary Examiner* — Cheng Yuan Huang
(74) *Attorney, Agent, or Firm* — Cheng Law Group, PLLC (57) ABSTRACT There is provided an interlayer film for laminated glass with which the adhesive force between the interlayer film and a laminated glass member of the laminated glass can be effectively improved. The interlayer film for laminated glass according to the present invention has one-layer structure or a two or more-layer structure, is provided with a first layer containing a thermoplastic resin, a plasticizer and a metal element as a surface layer of the interlayer film, and the first layer is a first layer having a contact angle of greater than 40.1° when measured by a sessile drop method using diiodomethane or a first layer having a contact angle of greater than 54.2° when measured by a sessile drop method using ethylene glycol.

18 Claims, 2 Drawing Sheets

(51) Int. Cl.
*B32B 27/30* (2006.01)
*B32B 27/08* (2006.01)
*B32B 27/18* (2006.01)
*B32B 27/22* (2006.01)

(52) U.S. Cl.
CPC ........ *B32B 17/10761* (2013.01); *B32B 27/08* (2013.01); *B32B 27/18* (2013.01); *B32B 27/22* (2013.01); *B32B 27/306* (2013.01); *C08K 5/098* (2013.01); *B32B 2250/03* (2013.01); *B32B 2605/00* (2013.01); *C08J 2329/14* (2013.01)

(58) Field of Classification Search
CPC ......... B32B 27/18; B32B 27/08; B32B 27/22; B32B 2250/03; B32B 2605/00; C08J 2329/14; C08J 5/18; C08K 5/0016; C08K 5/098; C08K 5/103; C08L 101/00
See application file for complete search history.

(56) References Cited

U.S. PATENT DOCUMENTS

| | | | |
|---|---|---|---|
| 2002/0006508 | A1 | 1/2002 | Shichiri et al. |
| 2002/0136906 | A1 | 9/2002 | Schohi et al. |
| 2002/0150764 | A1 | 10/2002 | Shichiri et al. |
| 2007/0014976 | A1 | 1/2007 | Matsudo |
| 2007/0134487 | A1 | 6/2007 | Marumoto |
| 2009/0035583 | A1 | 2/2009 | Fisher |
| 2010/0104866 | A1 | 4/2010 | Shimazumi et al. |
| 2010/0164918 | A1 | 7/2010 | Kondo |
| 2012/0244363 | A1 | 9/2012 | Fisher |
| 2013/0074910 | A1* | 3/2013 | Isoue ............... B32B 17/10036 136/251 |
| 2013/0183507 | A1* | 7/2013 | Matsuda ........... B32B 17/10036 428/213 |
| 2013/0288061 | A1 | 10/2013 | Kitano et al. |
| 2014/0020759 | A1 | 1/2014 | Oda et al. |
| 2015/0044472 | A1 | 2/2015 | Shimazumi et al. |
| 2017/0001416 | A1 | 1/2017 | Yamaguchi et al. |
| 2018/0037711 | A1 | 2/2018 | Kitano et al. |

FOREIGN PATENT DOCUMENTS

| | | |
|---|---|---|
| CN | 103261113 A | 8/2013 |
| EP | 1 997 785 A1 | 12/2008 |
| EP | 3 053 892 A1 | 8/2016 |
| EP | 3 124 452 A1 | 2/2017 |
| JP | 5-186250 A | 7/1993 |
| JP | 7-206484 A | 8/1995 |
| JP | 10-310741 A | 11/1998 |
| JP | 2999177 B2 | 1/2000 |
| JP | 2000-103654 A | 4/2000 |
| JP | 2000-211952 A | 8/2000 |
| JP | 2001-163640 A | 6/2001 |
| JP | 2002-505210 A | 2/2002 |
| JP | 3635635 B2 | 4/2005 |
| JP | 2006297728 A * | 11/2006 ............ B29C 48/92 |
| JP | 2007-70200 A | 3/2007 |
| JP | 2008-60522 A | 3/2008 |
| JP | 2010-201932 A | 9/2010 |
| JP | 2011-26184 A | 2/2011 |
| JP | 2012-83748 A | 4/2012 |
| JP | 2013-91793 A | 5/2013 |
| JP | 2013-108084 A | 6/2013 |
| JP | 2015-67804 A | 4/2015 |
| JP | 5855796 B1 | 2/2016 |
| WO | WO-00/18698 A1 | 4/2000 |
| WO | WO-2005/090459 A1 | 9/2005 |
| WO | WO-2008/122612 A1 | 10/2008 |
| WO | WO-2008/123150 A1 | 10/2008 |

OTHER PUBLICATIONS

Notice of Written Opinion by Opponent for the Application No. 2016-700712 from Japan Patent Office dated Jun. 5, 2017.
Supplementary European Search Report for the Application No. EP 15 77 2988 dated Dec. 11, 2017.
The First Office Action for the Application No. 201580016679.6 from The State Intellectual Propeity Office of the People's Republic of China dated Jun. 4, 2018.
Japanese Notice of Written Opposition for Patent No. JP 5855796 dated Aug. 9, 2016.
Imachl, Masaki et al., "On a Method for Analysis of Wettability by Liquid", Fukui University: Faculty of Technology Research Report, 1992, vol. 40, No. 2, pp. 361-366.
Arishima, Hiroyuki, "Experimental Result Report", Kuraray Co., Ltd. PVB Development Department, 2016, pp. 1-2.
Kiyoharu, Tadanaga, "Evaluation of Wettability", New Glass, 2005, vol. 20, No. 3, pp. 47-50.
Written Opinion of the International Searching Authority (PCT/ISA/237) for Application No. PCT/JP2015/060212 dated Jun. 23, 2015 (English Translation mailed Oct. 13, 2016).
International Search Report for the Application No. PCT/JP2015/060212 dated Jun. 23, 2015.
Written Opinion of the International Searching Authority (PCT/ISA/237) for Application No. PCT/JP2015/080212 dated Jun. 23, 2015.
Notification of Reasons for Refusal for the Application No. 2015-240319 fromJapan Patent Office dated May 15, 2018.
Examination Report for the Application No. 201637030103 from the Intellectual Property India Office dated Jun. 10, 2019.
European Office Action for the Application No. EP 15 772 988.0 dated Feb. 1, 2021.

* cited by examiner

INTERMEDIATE FILM FOR LAMINATED GLASS, METHOD FOR MANUFACTURING INTERMEDIATE FILM FOR LAMINATED GLASS, AND LAMINATED GLASS

TECHNICAL FIELD

The present invention relates to an interlayer film for laminated glass used for obtaining laminated glass and a method for manufacturing the interlayer film for laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is manufactured by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film.

Furthermore, the following Patent Document 1 also describes a multilayer interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount less than or equal to 30 parts by weight.

In Patent Document 1, examples of the alkali metal salt or the alkaline earth metal salt include salts of K, Na and Mg.

Moreover, the following Patent Document 1 discloses an interlayer film formed of a resin composition containing a polyvinyl acetal resin, a plasticizer, a metal salt of a carboxylic acid and an organic acid.

In Patent Document 2, examples of the metal salt of a carboxylic acid include salts of Mg, Ca and Zn.

RELATED ART DOCUMENT

Patent Document

Patent Document 1: JP 2007-070200 A
Patent Document 2: JP 05-186250 A

SUMMARY OF THE INVENTION

Problems to be Solved by the Invention

In the case where the adhesive force between an interlayer film and a glass plate in a sheet of laminated glass is too low, the sheet of laminated glass becomes easy to break when subjected to external impact and broken pieces of glass become easy to be scattered. In the case where the adhesive force between an interlayer film and a glass plate is too high, the interlayer film and the glass plate are liable to break simultaneously. Accordingly, in order to attain a high level of safety of the laminated glass, it is necessary to adjust the adhesive force between an interlayer film and a glass plate within a certain range. With regard to a sheet of laminated glass used for an automobile, adjusting the adhesive force between an interlayer film and a glass plate within a certain range plays a major role in absorbing the impact received by the sheet of laminated glass when an occupant or an article collides therewith at the time of an automobile accident or the like and preventing an occupant or an article from penetrating through the sheet of laminated glass. Moreover, with regard to a sheet of laminated glass used for a building, adjusting the adhesive force between an interlayer film and a glass plate within a certain range plays a major role in allowing broken pieces of glass to become difficult to be scattered even when the sheet of laminated glass is broken by a flying object coming from the outside thereof and preventing a flying object coming from the outside thereof from penetrating through the sheet of laminated glass.

For the purpose of adjusting the adhesive force between an interlayer film and a glass plate, in Patent Documents 1 and 2, an adhesive force regulating agent is used.

However, even if a sheet laminated glass is prepared with a conventional adhesive force regulating agent, there are cases where the adhesive force between an interlayer film and a glass plate becomes difficult to be well controlled.

An object of the present invention is to provide an interlayer film for laminated glass with which the adhesive force between the interlayer film and a laminated glass member of the laminated glass can be effectively improved and a method for manufacturing the interlayer film for laminated glass. Moreover, the present invention is also aimed at providing laminated glass prepared with the interlayer film for laminated glass.

Means for Solving the Problems

According to a broad aspect of the present invention, there is provided an interlayer film for laminated glass having a one-layer structure or a two or more-layer structure, being provided with a first layer containing a thermoplastic resin, a plasticizer and a metal element as a surface layer thereof, the first layer being a first layer having a contact angle of greater than 40.1° when measured by a sessile drop method using diiodomethane or a first layer having a contact angle of greater than 54.2° when measured by a sessile drop method using ethylene glycol.

In a specific aspect of the interlayer film for laminated glass according to the present invention, the content of the metal element in the first layer is greater than or equal to 20 ppm and less than or equal to 200 ppm.

In a specific aspect of the interlayer film for laminated glass according to the present invention, the first layer contains the metal element as a metal element derived from an alkali metal salt or an alkaline earth metal salt added thereto.

In a specific aspect of the interlayer film for laminated glass according to the present invention, the metal element is a polyvalent metal element.

In a specific aspect of the interlayer film for laminated glass according to the present invention, the first layer contains the metal element as a metal element derived from magnesium acetate or magnesium 2-ethylbutyrate added thereto.

In a specific aspect of the interlayer film for laminated glass according to the present invention, the first layer is obtained by using a vent type extruder and by being extruded under the condition of the gauge pressure of vacuum venting of higher than or equal to 500 mmHg.

In a specific aspect of the interlayer film for laminated glass according to the present invention, the interlayer film for laminated glass has a two or more-layer structure and is provided with a second layer containing a thermoplastic resin and a plasticizer as a surface layer of the interlayer film, and the second layer is arranged on a first surface side of the first layer.

In a specific aspect of the interlayer film for laminated glass according to the present invention, the second layer contains a metal element, and the second layer is a second layer having a contact angle of greater than 40.1° when measured by a sessile drop method using diiodomethane or a second layer having a contact angle of greater than 54.2° when measured by a sessile drop method using ethylene glycol.

In a specific aspect of the interlayer film for laminated glass according to the present invention, the interlayer film for laminated glass has a three or more-layer structure and is further provided with a third layer containing a thermoplastic resin and a plasticizer, and the third layer is arranged between the first layer and the second layer.

In a specific aspect of the interlayer film for laminated glass according to the present invention, the interlayer film for laminated glass has a one-layer structure and is provided with only the first layer.

It is preferred that the thermoplastic resin contained in the first layer be a polyvinyl acetal resin. It is preferred that the thermoplastic resin contained in the second layer be a polyvinyl acetal resin. It is preferred that the thermoplastic resin contained in the third layer be a polyvinyl acetal resin.

According to a broad aspect of the present invention, there is provided a method for manufacturing an interlayer film for laminated glass described above including the step of obtaining the first layer by using a vent type extruder and by being extruded under the condition of the gauge pressure of vacuum venting of higher than or equal to 500 mmHg.

According to a broad aspect of the present invention, there is provided laminated glass including a first laminated glass member, a second laminated glass member and an interlayer film for laminated glass described above, wherein the interlayer film for laminated glass is arranged between the first glass member and the second glass member.

Effect of the Invention

Since the interlayer film for laminated glass according to the present invention has a one-layer structure or a two or more-layer structure, is provided with a first layer containing a thermoplastic resin, a plasticizer and a metal element as a surface layer of the interlayer film, and the first layer is a first layer having a contact angle of greater than 40.1° when measured by a sessile drop method using diiodomethane or a first layer having a contact angle of greater than 54.2° when measured by a sessile drop method using ethylene glycol, it is possible to effectively improve the adhesive force between the interlayer film and a laminated glass member of the laminated glass prepared with the interlayer film for laminated glass according to the present invention.

MODE(S) FOR CARRYING OUT THE INVENTION

Hereinafter, the present invention will be described in detail.

The interlayer film for laminated glass (in the present specification, sometimes abbreviated as "the interlayer film") according to the present invention has a one-layer structure or a two or more-layer structure. The interlayer film according to the present invention may have a one-layer structure, may have a two or more-layer structure and may have a three or more-layer structure. The interlayer film according to the present invention is provided with a first layer containing a thermoplastic resin, a plasticizer and a metal element. The interlayer film according to the present invention may be a single-layered interlayer film provided with only the first layer and may be a multi-layered interlayer film provided with the first layer and another layer. The interlayer according to the present invention is provided with the first layer as a surface layer of the interlayer film.

In the interlayer film according to the present invention, the first layer is a first layer having a contact angle of greater than 40.1° when measured by a sessile drop method using diiodomethane or a first layer having a contact angle of greater than 54.2° when measured by a sessile drop method using ethylene glycol.

Since the interlayer film according to the present invention is provided with the above-mentioned configuration, it is possible to effectively improve the adhesive force between the interlayer film and a laminated glass member of a sheet of laminated glass prepared with the interlayer film according to the present invention. The adhesive force between the interlayer film and a laminated glass member can be improved, and as a result thereof, the penetration resistance of laminated glass can be enhanced. It has been found by the present inventors that allowing a metal element to be contained in the first layer and allowing the contact angle on the first layer to satisfy the above-mentioned requirement enable the penetration resistance of laminated glass to be effectively enhanced.

From the viewpoint of further effectively improving the adhesive force between the interlayer film and a laminated glass member, with regard to each of an interlayer film, a first layer and a second layer, the contact angle measured by a sessile drop method using diiodomethane is preferably greater than or equal to 40.2°, more preferably greater than or equal to 40.4°, further preferably greater than or equal to 40.6°, especially preferably greater than or equal to 41° and most preferably greater than or equal to 41.2°. With regard to each of an interlayer film, a first layer and a second layer, although the upper limit of the contact angle measured by a sessile drop method using diiodomethane is not particularly limited, the contact angle is preferably less than or equal to 60°, more preferably less than or equal to 55°, further preferably less than or equal to 50°, especially preferably less than or equal to 45° and most preferably less than or equal to 43°.

From the viewpoint of further effectively improving the adhesive force between the interlayer film and a laminated glass member, with regard to each of an interlayer film, a first layer and a second layer, the contact angle measured by a sessile drop method using ethylene glycol is preferably greater than or equal to 54.5°, more preferably greater than or equal to 54.9°, further preferably greater than or equal to 55°, especially preferably greater than or equal to 55.5° and most preferably greater than or equal to 57.4°. With regard to each of an interlayer film, a first layer and a second layer, although the upper limit of the contact angle measured by a sessile drop method using ethylene glycol is not particularly limited, the contact angle is preferably less than or equal to 70°, more preferably less than or equal to 65°, further preferably less than or equal to 64°, especially preferably less than or equal to 63° and most preferably less than or equal to 62°.

The contact angle is measured at a point on the external surface of the surface layer. As a measuring apparatus, "Drop Master 500" available from Kyowa Interface Science Co., Ltd. can be used. Moreover, specifically, the contact angle is measured in the following manner.

(Measurement Environment) Temperature 23° C., Relative Humidity 50%

(Measurement method) Diiodomethane or ethylene glycol is contained in a syringe, and a 2.0-μL liquid droplet is prepared so as to be positioned at the needle tip. The prepared liquid droplet is brought into contact with the surface of an interlayer film to arrange the liquid droplet on the interlayer film. At the end of 1 second after the liquid droplet is arranged on the interlayer film, an image of the liquid droplet is photographed. This image of the liquid droplet is analyzed to calculate a contact angle by a θ/2 method. An average value of 10 measured values is defined as the contact angle. In this connection, the interlayer film is allowed to stand for 24 hours under the measurement environment before measurement.

In this connection, in the present invention, the contact angle is defined as an index, which is not an index for the surface shape of a surface layer or an interlayer film, for indicating the nature of the material itself constituting a surface layer or an intermediate layer (such as the combination of components and the existence state of the component). As such, at the time of measuring the contact angle of a layer or an interlayer film to be measured for the contact angle, it is preferred that the surface of a surface layer or an interlayer film in the state of being smooth be measured therefor.

In the case where a layer or an interlayer film to be measured for the contact angle has a recess/protrusion shape, which is formed by an emboss processing, on the surface thereof, in order to determine the contact angle, it is preferred that the layer or the interlayer film be prepared by allowing a sheet of transparent float glass, a polyethylene terephthalate (PET) film, a layer or an interlayer film to be measured for the contact angle, a polyethylene terephthalate (PET) film and a sheet of transparent float glass to be layered in this order to obtain a laminate, allowing the obtained laminate to be heated at 70° C. in a heating oven and to pass through a nip roll (the roll pressure of 0.44 MPa, the linear velocity of 1 m/minute), and then, allowing the sheet of transparent float glass and the PET film to be peeled off from each other.

The interlayer film may have a two or more layer structure and may be provided with a second layer in addition to a first layer. It is preferred that the interlayer film be provided with a second layer as a surface layer of the interlayer film. It is preferred that the interlayer film be provided with a second layer containing a thermoplastic resin and a plasticizer as a surface layer of the interlayer film. It is preferred that the first layer be a surface layer at one side of the intermediate layer and the second layer be a surface layer at the other side of the intermediate layer. In the case where the interlayer film is provided with the second layer, the first layer is arranged on a first surface side of the second layer. In this case, the first layer and the second layer may be brought into direct contact with each other, and another layer (such as a third layer described below) may be arranged between the first layer and the second layer.

The interlayer film may have a three or more-layer structure and may be provided with a third layer in addition to a first layer and a second layer. It is preferred that the interlayer film be provided with a third layer containing a thermoplastic resin and a plasticizer. In the case where the interlayer film is provided with the second layer, the third layer is arranged between the first layer and the second layer. In this case, the first layer and the third layer may be brought into direct contact with each other, and another layer may be arranged between the first layer and the third layer. The second layer and the third layer may be brought into direct contact with each other, and another layer may be arranged between the second layer and the third layer.

Hereinafter, specific embodiments of the present invention will be described with reference to the drawings.

Figure 1:
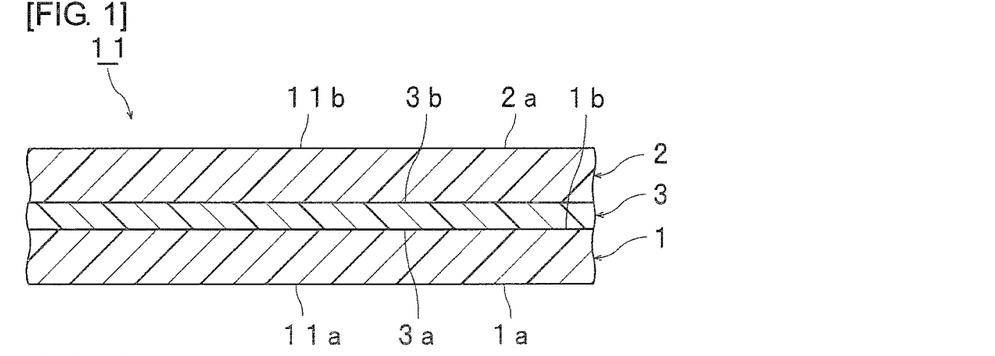
FIG. 1 is a sectional view schematically showing an interlayer film for laminated glass in accordance with the first embodiment of the present invention.

FIG. 1 shows an interlayer film for laminated glass in accordance with the first embodiment of the present invention schematically represented as a sectional view.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 is provided with a first layer 1, a second layer 2 and a third layer 3. The first layer 1 is arranged on a first surface 3a of the third layer 3 to be layered thereon. The second layer 2 is arranged on a second surface 3b opposite to the first surface 3a of the third layer 3 to be layered thereon. The third layer 3 is arranged between the first layer 1 and the second layer 2 to be sandwiched therebetween. The third layer 3 is an intermediate layer. The third layer 3 and the second layer 2 are arranged side by side in this order on a first surface 1b side of the first layer 1. Each of the first layer 1 and the second layer 2 is a protective layer and is a surface layer in the present embodiment. Accordingly, the interlayer film 11 has a multilayer structure (a first layer 1/a third layer 3/a second layer 2) in which the first layer 1, the third layer 3 and the second layer 2 are layered in this order.

In this connection, other layers may be arranged between the first layer 1 and the third layer 3 and between the third layer 3 and the second layer 2, respectively. It is preferred that each of the first layer 1 and the second layer 2 be directly layered on the third layer 3. Examples of another layer include a layer containing polyethylene terephthalate.

The first layer 1 contains a thermoplastic resin, a plasticizer and a metal element. It is preferred that the second layer 2 contain a thermoplastic resin and it is preferred that the second layer 2 contain a plasticizer. The first layer 1 a first layer having a contact angle of greater than 40.1° when measured by a sessile drop method using diiodomethane or a first layer having a contact angle of greater than 54.2° when measured by a sessile drop method using ethylene glycol. It is preferred that the second layer 2 contain a metal element. It is preferred that the second layer 2 be a second layer having a contact angle of greater than 40.1° when measured by a sessile drop method using diiodomethane or a second layer having a contact angle of greater than 54.2° when measured by a sessile drop method using ethylene glycol. It is preferred that the third layer 3 contain a thermoplastic resin and it is preferred that the third layer 3 contain a plasticizer.

Figure 2:
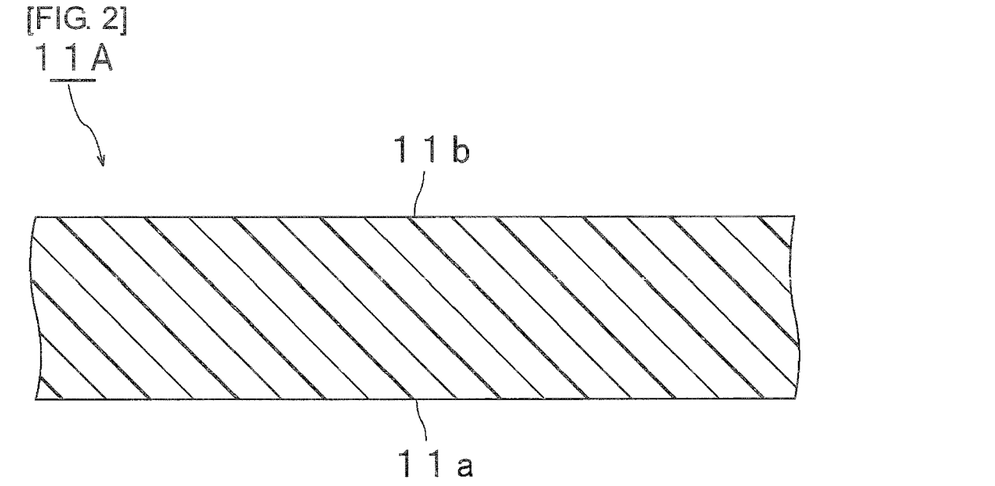
FIG. 2 is a sectional view schematically showing an interlayer film for laminated glass in accordance with the second embodiment of the present invention.

FIG. 2 shows an interlayer film for laminated glass in accordance with the second embodiment of the present invention schematically represented as a sectional view.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

The interlayer film 11A (first layer) contains a thermoplastic resin, a plasticizer and a metal element. The interlayer film 11A (first layer) is an interlayer film (first layer) having a contact angle of greater than 40.1° when measured by a sessile drop method using diiodomethane or an interlayer film (first layer) having a contact angle of greater than 54.2° when measured by a sessile drop method using ethylene glycol.

Hereinafter, the details of the first layer (including a single-layered interlayer film), the second layer and the third layer which constitute the interlayer film according to the present invention, and the details of each ingredient contained in the first layer, the second layer and the third layer will be described.

(Polyvinyl Acetal Resin or Thermoplastic Resin)

It is preferred that the first layer (including a single-layered interlayer film) contain a thermoplastic resin (hereinafter, sometimes described as a thermoplastic resin (1)), and it is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)), and it is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)), and it is preferred that the third layer contain a polyvinyl acetal resin (hereinafter, sometimes described as a polyvinyl acetal resin (3)) as the thermoplastic resin (3). The thermoplastic resin (1), the thermoplastic resin (2) and the thermoplastic resin (3) may be the same as or different from one another. One kind of each of the thermoplastic resin (1), the thermoplastic resin (2) and the thermoplastic resin (3) may be used alone, and two or more kinds thereof may be combinedly used. The polyvinyl acetal resin (1), the polyvinyl acetal resin (2) and the polyvinyl acetal resin (3) may be the same as or different from one another. One kind of each of the polyvinyl acetal resin (1), the polyvinyl acetal resin (2) and the polyvinyl acetal resin (3) may be used alone, and two or more kinds thereof may be combinedly used.

Examples of the thermoplastic resin include a polyvinyl acetal resin, an ethylene-vinyl acetate copolymer resin, an ethylene-acrylic acid copolymer resin, a polyurethane resin, and a polyvinyl alcohol resin. Thermoplastic resins other than these may be used.

For example, the polyvinyl acetal resin can be produced by acetalizing polyvinyl alcohol with an aldehyde. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol is preferably greater than or equal to 200, more preferably greater than or equal to 500, further preferably greater than or equal to 1500, still further preferably greater than or equal to 1600, especially preferably greater than or equal to 2600, most preferably greater than or equal to 2700, preferably less than or equal to 5000, more preferably less than or equal to 4000 and further preferably less than or equal to 3500. When the average polymerization degree is greater than or equal to the above lower limit, the penetration resistance of laminated glass is further enhanced. When the average polymerization degree is less than or equal to the above upper limit, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin lie within the range of 3 to 5, and it is more preferred that the number of carbon atoms of the acetal group be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, an aldehyde with 1 to 10 carbon atoms is suitably used as the above-mentioned aldehyde. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be used in combination.

The content of the hydroxyl group of each of the polyvinyl acetal resin (1) and the polyvinyl acetal resin (2) is preferably greater than or equal to 25% by mole, more preferably greater than or equal to 28% by mole, further preferably greater than or equal to 29% by mole, preferably less than or equal to 35% by mole, more preferably less than or equal to 32% by mole and especially preferably less than or equal to 31% by mole. When the content of the hydroxyl group is greater than or equal to the above lower limit, the adhesive force of the interlayer film is further heightened. Moreover, when the content of the hydroxyl group is less than or equal to the above upper limit, the flexibility of the interlayer film is enhanced and the handling of the interlayer film is facilitated.

The content of the hydroxyl group (the amount of hydroxyl groups) of the polyvinyl acetal resin (3) is preferably greater than or equal to 17% by mole, more preferably greater than or equal to 20% by mole, further preferably greater than or equal to 22% by mole, preferably less than or equal to 30% by mole, more preferably less than 27% by mole and further preferably less than or equal to 25% by mole. When the content of the hydroxyl group is greater than or equal to the above lower limit, the adhesive force of the interlayer film is further heightened. In particular, when the content of the hydroxyl group of the polyvinyl acetal resin (3) is greater than or equal to 20% by mole, the resin is high in reaction efficiency and is excellent in productivity, and moreover, when less than 27% by mole, the sound insulating properties of laminated glass are further heightened. Moreover, when the content of the hydroxyl group is less than or equal to the above upper limit, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" to be determined.

The acetylation degree of each of the polyvinyl acetal resin (1) and the polyvinyl acetal resin (2) is preferably greater than or equal to 0.01% by mole, more preferably greater than or equal to 0.5% by mole, preferably less than or equal to 10% by mole and more preferably less than or equal to 2% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced.

The acetylation degree (the amount of acetyl groups) of the polyvinyl acetal resin (3) is preferably greater than or equal to 0.01% by mole, more preferably greater than or equal to 0.1% by mole, further preferably greater than or equal to 7% by mole, still further preferably greater than or equal to 9% by mole, preferably less than or equal to 30% by mole, more preferably less than or equal to 25% by mole and further preferably less than or equal to 15% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced. In particular, when the acetylation degree of the polyvinyl acetal resin (3) is greater than or equal to 0.1% by mole and less than or equal to 25% by mole, the laminated glass is excellent in penetration resistance.

The acetylation degree is a mole fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral".

The acetalization degree of each of the polyvinyl acetal resin (1) and the polyvinyl acetal resin (2) (the butyralization degree in the case of a polyvinyl butyral resin) is preferably greater than or equal to 55% by mole, more preferably greater than or equal to 67% by mole, preferably less than or equal to 75% by mole and more preferably less than or equal to 71% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree of the polyvinyl acetal resin (3) (the butyralization degree in the case of a polyvinyl butyral resin) is preferably greater than or equal to 47% by mole, more preferably greater than or equal to 60% by mole, preferably less than or equal to 80% by mole and more preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage. The acetalization degree can be calculated by a method in accordance with JIS K6728 "Testing methods for polyvinyl butyral".

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. In the case where the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (3) be a polyvinyl acetal resin (A) with an acetylation degree (a) less than or equal to 8% by mole and an acetalization degree (a) greater than or equal to 66% by mole or a polyvinyl acetal resin (B) with an acetylation degree (b) greater than 8% by mole. The polyvinyl acetal resin (3) may be the polyvinyl acetal resin (A) and may be the polyvinyl acetal resin (B).

The acetylation degree (a) of the polyvinyl acetal resin (A) is less than or equal to 8% by mole, preferably less than or equal to 7.5% by mole, more preferably less than or equal to 7% by mole, further preferably less than or equal to 6.5% by mole, especially preferably less than or equal to 5% by mole, preferably greater than or equal to 0.1% by mole, more preferably greater than or equal to 0.5% by mole, further preferably greater than or equal to 0.8% by mole and especially preferably greater than or equal to 1% by mole. When the acetylation degree (a) is less than or equal to the above upper limit and greater than or equal to the above lower limit, the transfer of a plasticizer can be easily controlled and the sound insulating properties of laminated glass are further heightened.

The acetalization degree (a) of the polyvinyl acetal resin (A) is greater than or equal to 66% by mole, preferably greater than or equal to 70% by mole, more preferably greater than or equal to 70.5% by mole, further preferably greater than or equal to 71% by mole, especially preferably greater than or equal to 71.5% by mole, most preferably greater than or equal to 72% by mole, preferably less than or equal to 85% by mole, more preferably less than or equal to 83% by mole, further preferably less than or equal to 81% by mole and especially preferably less than or equal to 79% by mole. When the acetalization degree (a) is greater than or equal to the above lower limit, the sound insulating properties of laminated glass are further heightened. When the acetalization degree (a) is less than or equal to the above upper limit, the reaction time required for producing the polyvinyl acetal resin (A) can be shortened.

The content (a) of the hydroxyl group of the polyvinyl acetal resin (A) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole and especially preferably less than or equal to 28% by mole. When the content (a) of the hydroxyl group is greater than or equal to the above lower limit, the adhesive force of the third layer is further heightened. When the content (a) of the hydroxyl group is less than or equal to the above upper limit, the sound insulating properties of laminated glass are further heightened.

The acetylation degree (b) of the polyvinyl acetal resin (B) is greater than 8% by mole, preferably greater than or equal to 9% by mole, more preferably greater than or equal to 9.5% by mole, further preferably greater than or equal to 10% by mole, especially preferably greater than or equal to 10.5% by mole, preferably less than or equal to 30% by mole, more preferably less than or equal to 28% by mole, further preferably less than or equal to 26% by mole and especially preferably less than or equal to 24% by mole. When the acetylation degree (b) is greater than or equal to the above lower limit, the sound insulating properties of laminated glass are further heightened. When the acetylation degree (b) is less than or equal to the above upper limit, the reaction time required for producing the polyvinyl acetal resin (B) can be shortened.

The acetalization degree (b) of the polyvinyl acetal resin (B) is preferably greater than or equal to 50% by mole, more preferably greater than or equal to 53% by mole, further preferably greater than or equal to 55% by mole, especially preferably greater than or equal to 60% by mole, preferably less than or equal to 80% by mole, more preferably less than or equal to 78% by mole, further preferably less than or equal to 76% by mole and especially preferably less than or equal to 74% by mole. When the acetalization degree (b) is greater than or equal to the above lower limit, the sound insulating properties of laminated glass are further heightened. When the acetalization degree (b) is less than or equal to the above upper limit, the reaction time required for producing the polyvinyl acetal resin (B) can be shortened.

The content (b) of the hydroxyl group of the polyvinyl acetal resin (B) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole and especially preferably less than or equal to 28% by mole. When the content (b) of the hydroxyl group is greater than or equal to the above lower limit, the adhesive force of the third layer is further heightened. When the content (b) of the hydroxyl group is less than or equal to the above upper limit, the sound insulating properties of laminated glass are further heightened.

It is preferred that each of the polyvinyl acetal resin (1), the polyvinyl acetal resin (2) and the polyvinyl acetal resin (3) be a polyvinyl butyral resin. It is preferred that each of the polyvinyl acetal resin (A) and the polyvinyl acetal resin (B) be a polyvinyl butyral resin.

(Plasticizer)

The first layer (including a single-layered interlayer film) contains a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By using a polyvinyl acetal resin and a plasticizer together, the adhesive force of a layer containing the polyvinyl acetal resin and the plasticizer to a laminated glass member or another layer is moderately heightened. The plasticizer is not particularly limited. The plasticizer (1), the plasticizer (2) and the plasticizer (3) may be the same as or different from one another. One kind of the plasticizer may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer. Of these, organic ester plasticizers are preferred. It is preferred that the plasticizer be a liquid plasticizer.

Examples of the monobasic organic acid ester include a glycol ester obtained by the reaction of a glycol with a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, hepthylic acid, n-octylic acid, 2-ethylhexanoic acid, n-nonylic acid, and decylic acid.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, and azelaic acid.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, and a mixture of a phosphoric acid ester and an adipic acid ester. Organic ester plasticizers other than these may be used. Other adipic acid esters other than the above-described adipic acid esters may be used.

Examples of the organic phosphate plasticizer include tributoxyethyl phosphate, isodecyl phenyl phosphate, and triisopropyl phosphate.

It is preferred that the plasticizer be a diester plasticizer represented by the following formula (1).

[Chemical 1]

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

(Heat Shielding Compound)

It is preferred that the interlayer film include a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be combinedly used.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be combinedly used.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably greater than or equal to 0.001% by weight, more preferably greater than or equal to 0.005% by weight, further preferably greater than or equal to 0.01% by weight, especially preferably greater than or equal to 0.02% by weight, preferably less than or equal to 0.2% by weight, more preferably less than or equal to 0.1% by weight, further preferably less than or equal to 0.05% by weight and especially preferably less than or equal to 0.04% by weight. When the content of the Ingredient X is greater than or equal to the above lower limit and less than or equal to the above upper limit, the heat shielding properties are sufficiently enhanced and the visible light transmittance is sufficiently heightened. For example, it is possible to make the visible light transmittance greater than or equal to 70%.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is a heat shielding compound. By the use of heat shielding particles, infrared rays (heat rays) can be effectively cut off. One kind of the heat shielding particles may be used alone, and two or more kinds thereof may be combinedly used.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength greater than or equal to 780 nm which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, and lanthanum hexaboride ($LaB_6$) particles. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_yO_z \quad \text{Formula (X1)}$$

In the foregoing formula (X1), W represents tungsten, O represents oxygen, and y and z satisfy the equation of $2.0 < z/y < 3.0$.

$$M_xW_yO_z \quad \text{Formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the equations of $0.001 \le x/y \le 1$ and $2.0 < z/y \le 3.0$.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, and rubidium-doped tungsten oxide particles.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably greater than or equal to 0.01 μm, more preferably greater than or equal to 0.02 μm, preferably less than or equal to 0.1 μm and more preferably less than or equal to 0.05 μm. When the average particle diameter is greater than or equal to the above lower limit, the heat ray shielding properties are sufficiently heightened. When the average particle diameter is less than or equal to the above upper limit, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), the content of the heat shielding particles is preferably greater than or equal to 0.01% by weight, more preferably greater than or equal to 0.1% by weight, further preferably greater than or equal to 1% by weight, especially preferably greater than or equal to 1.5% by weight, preferably less than or equal to 6% by weight, more preferably less than or equal to 5.5% by weight, further preferably less than or equal to 4% by weight, especially preferably less than or equal to 3.5% by weight and most preferably less than or equal to 3.0% by weight. When the content of the heat shielding particles is greater than or equal to the above lower limit and less than or equal to the above upper limit, the heat shielding properties are sufficiently enhanced and the visible light transmittance is sufficiently heightened.

It is preferred that a layer containing the heat shielding particles (a first layer, a second layer or a third layer) contain the heat shielding particles in a proportion greater than or equal to 0.1 g/m$^2$ and less than or equal to 12 g/m$^2$. In the case where the proportion of the heat shielding particles lies within the above-mentioned range, the heat shielding properties are sufficiently enhanced and the visible light transmittance is sufficiently heightened. The proportion of the heat shielding particles is preferably greater than or equal to 0.5 g/m$^2$, more preferably greater than or equal to 0.8 g/m$^2$, further preferably greater than or equal to 1.5 g/m$^2$, especially preferably greater than or equal to 3 g/m$^2$, preferably less than or equal to 11 g/m$^2$, more preferably less than or equal to 10 g/m$^2$, further preferably less than or equal to 9 g/m$^2$ and especially preferably less than or equal to 7 g/m$^2$. When the proportion is greater than or equal to the above lower limit, the heat shielding properties are further enhanced. When the proportion is less than or equal to the above upper limit, the visible light transmittance is further heightened.

(Metal Element)

The interlayer film includes a metal element. The first layer contains a metal element. It is preferred that the second layer contain a metal element. It is preferred that each of the interlayer film, the first layer and the second layer contain the metal element which is derived from a metal salt added thereto. By the use of the metal salt, it is possible to improve the adhesive force between the interlayer film and a laminated glass member and to effectively enhance the penetration resistance of laminated glass. One kind of the metal element may be used alone, and two or more kinds thereof may be combinedly used.

It is preferred that the metal salt be an alkali metal salt or an alkaline earth metal salt. In this case, only one among an alkali metal salt and an alkaline earth metal salt may be used, and both of the alkali metal salt and the alkaline earth metal salt may be used. In this connection, examples of the alkaline earth metal salt include a magnesium salt.

It is more preferred that the metal salt be an alkali metal salt of an organic acid with 2 to 16 carbon atoms or an alkaline earth metal salt of an organic acid with 2 to 16 carbon atoms, and it is further preferred that the metal salt be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, and potassium 2-ethylhexanoate.

From the viewpoint of further effectively improving the adhesive force between the interlayer film and a laminated glass member, it is preferred that the metal element be a polyvalent metal element. From the viewpoint of further effectively improving the adhesive force between the interlayer film and a laminated glass member, it is preferred that each of the interlayer film, the first layer and the second layer contain the metal element which is derived from an alkaline earth metal salt added thereto.

From the viewpoint of further effectively improving the adhesive force between the interlayer film and a laminated glass member, it is preferred that each of the interlayer film, the first layer and the second layer contain the metal element which is derived from magnesium acetate or magnesium 2-ethylbutyrate added thereto. In this case, only one among magnesium acetate and magnesium 2-ethylbutyrate may be used, and both of magnesium acetate and magnesium 2-ethylbutyrate may be used. From the viewpoint of further effectively improving the adhesive force between the interlayer film and a laminated glass member, it is preferred that both of magnesium acetate and magnesium 2-ethylbutyrate be used.

From the viewpoint of further effectively improving the adhesive force between the interlayer film and a laminated glass member, it is especially preferred that the metal element be composed of Mg and the like, and it is most preferred that the metal element be composed only of Mg.

Each of the total content of the metal element and the total content of Mg in layers containing the metal element (a first layer, a second layer and a third layer) is preferably greater than or equal to 5 ppm, more preferably greater than or equal to 10 ppm, further preferably greater than or equal to 20 ppm, preferably less than or equal to 300 ppm, more preferably less than or equal to 250 ppm, further preferably less than or equal to 200 ppm and especially preferably less than or equal to 100 ppm. When the total of the contents of the metal element is greater than or equal to the above lower limit and less than or equal to the above upper limit, the adhesivity between the interlayer film and a glass plate or the adhesivity between respective layers in the interlayer film can be further well controlled and the penetration resistance of laminated glass can be effectively enhanced.

The content of Mg in a layer containing the metal element (a first layer, a second layer or a third layer) is preferably greater than or equal to 5 ppm, more preferably greater than or equal to 10 ppm, further preferably greater than or equal to 20 ppm, preferably less than or equal to 300 ppm, more preferably less than or equal to 250 ppm, further preferably less than or equal to 200 ppm and especially preferably less than or equal to 100 ppm. When the content of Mg is greater than or equal to the above lower limit and less than or equal to the above upper limit, the adhesivity between the interlayer film and a glass plate or the adhesivity between respective layers in the interlayer film can be further well controlled and the penetration resistance of laminated glass can be effectively enhanced.

(Ultraviolet Ray Shielding Agent)

It is preferred that the interlayer film include an ultraviolet ray shielding agent. It is preferred that the first layer contain an ultraviolet ray shielding agent. It is preferred that the second layer contain an ultraviolet ray shielding agent. It is preferred that the third layer contain an ultraviolet ray shielding agent. By the use of an ultraviolet ray shielding agent, even when the interlayer film and the laminated glass are used for a long period of time, the visible light transmittance becomes further difficult to be lowered. One kind of the ultraviolet ray shielding agent may be used alone, and two or more kinds thereof may be combinedly used.

Examples of the ultraviolet ray shielding agent include an ultraviolet ray absorber. It is preferred that the ultraviolet ray shielding agent be an ultraviolet ray absorber.

Examples of the ultraviolet ray shielding agent include a metal-based ultraviolet ray shielding agent, a metal oxide-based ultraviolet ray shielding agent, a benzotriazole-based ultraviolet ray shielding agent, a benzophenone-based ultraviolet ray shielding agent, a triazine-based ultraviolet ray shielding agent, a malonic acid ester-based ultraviolet ray shielding agent, an oxanilide-based ultraviolet ray shielding agent, and a benzoate-based ultraviolet ray shielding agent.

Examples of the metal-based ultraviolet ray absorber include platinum particles, particles in which the surface of platinum particles is coated with silica, palladium particles, and particles in which the surface of palladium particles is coated with silica. It is preferred that the ultraviolet ray shielding agent not be heat shielding particles.

The ultraviolet ray shielding agent is preferably a benzotriazole-based ultraviolet ray shielding agent, a benzophenone-based ultraviolet ray shielding agent, a triazine-based ultraviolet ray shielding agent or a benzoate-based ultraviolet ray shielding agent, more preferably a benzotriazole-based ultraviolet ray shielding agent or a benzophenone-based ultraviolet ray shielding agent, and further preferably a benzotriazole-based ultraviolet ray absorber.

Examples of the metal oxide-based ultraviolet ray absorber include zinc oxide, titanium oxide, and cerium oxide. Furthermore, with regard to the metal oxide-based ultraviolet ray absorber, the surface thereof may be coated with any material. Examples of the coating material for the surface of the metal oxide-based ultraviolet ray absorber include an insulating metal oxide, a hydrolyzable organosilicon compound, and a silicone compound.

Examples of the insulating metal oxide include silica, alumina, and zirconia. For example, the insulating metal oxide has a band-gap energy greater than or equal to 5.0 eV.

Examples of the benzotriazole-based ultraviolet ray absorber include benzotriazole-based ultraviolet ray absorbers such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray shielding agent be a benzotriazole-based ultraviolet ray absorber containing halogen atoms, and it is more preferred that the ultraviolet ray shielding agent be a benzotriazole-based ultraviolet ray absorber containing chlorine atoms, since those are excellent in ultraviolet ray absorbing performance.

Examples of the benzophenone-based ultraviolet ray absorber include octabenzone ("Chimassorb 81" available from BASF Japan Ltd.).

Examples of the triazine-based ultraviolet ray absorber include "LA-F70" available from ADEKA CORPORATION, and 2-(4,6-diphenyl-1,3,5-triazine-2-yl)-5-[(hexyl)oxyl]-phenol ("Tinuvin 1577FF" available from BASF Japan Ltd.).

Examples of the malonic acid ester-based ultraviolet ray shielding agent include dimethyl(p-methoxybenzylidene)malonate, tetraethyl-2,2-(1,4-phenylenedimethylidene)bismalonate, and 2-(p-methoxybenzylidene)-bis(1,2,2,6,6-pentamethyl-4-piperidinyl)malonate.

Examples of a commercial product of the malonic acid ester-based ultraviolet ray shielding agent include Hostavin B-CAP, Hostavin PR-25 and Hostavin PR-31 (any of these is available from Clariant Japan K.K.).

Examples of the oxanilide-based ultraviolet ray shielding agent include a kind of oxalic acid diamide having a substituted aryl group on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the benzoate-based ultraviolet ray absorber include 2,4-di-tert-butylphenyl-3,5-di-tert-butyl-4-hydroxy-benzoate ("Tinuvin 120" available from BASF Japan Ltd.).

From the viewpoint of further suppressing the lowering in visible light transmittance after the lapse of a certain period of time, in 100% by weight of a layer containing the ultraviolet ray shielding agent (a first layer, a second layer or a third layer), the content of the ultraviolet ray shielding agent is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight and especially preferably less than or equal to 0.8% by weight. In particular, by allowing the content of the ultraviolet ray shielding agent to be greater than or equal to 0.2% by weight in 100% by weight of a layer containing the ultraviolet ray shielding agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be combinedly used.

Examples of the oxidation inhibitor include a phenol-based oxidation inhibitor, a sulfur-based oxidation inhibitor, and a phosphorus-based oxidation inhibitor. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid)ethylenebis(oxyethylene). One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, and 2,2'-methylenebis(4,6-di-t-butyl-1-phenyloxy)(2-ethylhexyloxy)phosphorus. One kind or two or more kinds among these oxidation inhibitors are suitably used.

Examples of a commercial product of the oxidation inhibitor include "Sumilizer BHT" available from Sumitomo Chemical Co., Ltd., and "Irganox 1010" available from Chiba-Geigy Japan Ltd.,.

With regard to the interlayer film and laminated glass, in order to maintain high visible light transmittance thereof over a long period of time, it is preferred that the content of the oxidation inhibitor be greater than or equal to 0.1% by weight in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be less than or equal to 2% by weight in 100% by weight of the interlayer film or in 100% by weight of the layer containing the oxidation inhibitor.

(Other Ingredients)

Each of the first layer, the second layer and the third layer may contain additives such as a flame retardant, an antistatic agent, a pigment, a dye, a moisture-resistance improving agent, a fluorescent brightening agent, and an infrared ray absorber, as necessary. One kind of these additives may be used alone, and two or more kinds thereof may be combinedly used.

(Other Details of Interlayer Film for Laminated Glass)

The thickness of the interlayer film for laminated glass according to the present invention is not particularly limited. From the viewpoint of the practical aspect and the viewpoint of sufficiently enhancing the heat shielding properties, the thickness of the interlayer film is preferably greater than or equal to 0.1 mm, more preferably greater than or equal to 0.25 mm, preferably less than or equal to 3 mm and more preferably less than or equal to 1.5 mm. When the thickness of the interlayer film is greater than or equal to the above lower limit, the penetration resistance of laminated glass is enhanced.

The ratio of the thickness (μm) of each of the first layer and the second layer to the whole thickness (μm) of the interlayer film is preferably greater than or equal to 0.1, more preferably greater than or equal to 0.2, preferably less than or equal to 0.9, more preferably less than or equal to 0.7 and further preferably less than or equal to 0.5. That is, when the thickness of the interlayer film for laminated glass is defined as T (μm), the thickness of each of the first layer and the second layer is preferably greater than or equal to 0.1 T, more preferably greater than or equal to 0.2 T, preferably less than or equal to 0.9 T, more preferably less than or equal to 0.7 T and further preferably less than or equal to 0.5 T. When the thickness of each of the first layer and the second layer is greater than or equal to the above lower limit, the adhesive force between respective layers and the adhesive force between the interlayer film and a laminated glass member are easily improved. In the case where an interlayer film has a three-layer structure with a stack of a first layer, a second layer and a third layer, the ratio of the total thickness (μm) of the first layer and the second layer to the whole thickness (μm) of the interlayer film is preferably greater than or equal to 0.5, more preferably greater than or equal to 0.6, preferably less than or equal to 0.95 and more preferably less than or equal to 0.9. When the thickness ratio is less than or equal to the above upper limit, the thickness of a sheet of laminated glass is thinned, and with regard to the interlayer film and the sheet of laminated glass, the handling properties thereof are further enhanced.

The production method of the interlayer film according to the present invention is not particularly limited. In the case of a single-layered interlayer film, examples of the production method of the interlayer film according to the present invention include a method of allowing a resin composition to be extruded using an extruder. In the case of a multi-layered interlayer film, examples of the production method of the interlayer film according to the present invention include a method of separately forming respective resin compositions used for constituting respective layers into respective layers, and then, for example, allowing the respective obtained layers to be layered, a method of allowing respective resin compositions used for constituting respective layers to be coextruded using an extruder and allowing the respective layers to be layered, and the like. A production method of extrusion-molding is preferred because the method is suitable for continuous production.

It is preferred that each of the interlayer film, the first layer and the second layer be obtained by using a vent type extruder and by being extruded under the condition of the gauge pressure of vacuum venting of higher than or equal to 500 mmHg. In this case, it is easy to control the contact angle measured by a sessile drop method using diiodomethane and the contact angle measured by a sessile drop method using ethylene glycol within the above-mentioned range. In the present invention, as mentioned above, it is preferred that the gauge pressure be set high to obtain an interlayer film.

Because the interlayer film is allowed to be excellent in production efficiency, it is preferred that respective polyvinyl acetal resins contained in the first layer and the second layer be the same as each other, it is more preferred that respective polyvinyl acetal resins contained in the first layer and the second layer be the same as each other and respective plasticizers contained therein be the same as each other, and it is further preferred that the first layer and the second layer be formed from the same resin composition as each other.

It is preferred that at least one surface among surfaces of both sides of the interlayer film have a recess/protrusion shape. It is more preferred that surfaces of both sides of the interlayer film have a recess/protrusion shape. The method for forming the recess/protrusion shape is not particularly limited, and examples thereof include an embossing roll method, a calender roll method, and a profile extrusion method. Of these, since it is possible to quantitatively form a plurality of embosses with a recess/protrusion shape constituting a constant uneven pattern, the embossing roll method is preferred.

(Laminated Glass)

Figure 3:
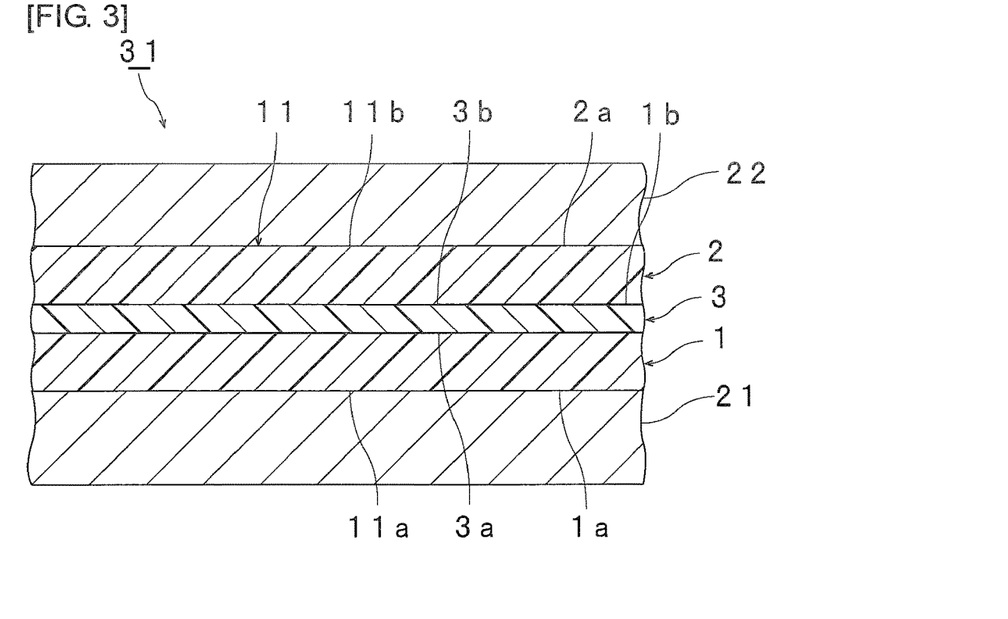
FIG. 3 is a sectional view schematically showing an example of laminated glass prepared with the interlayer film for laminated glass shown in FIG. 1.

FIG. 3 is a sectional view schematically showing an example of laminated glass prepared with the interlayer film for laminated glass shown in FIG. 1.

A laminated glass 31 shown in FIG. 3 is provided with a first laminated glass member 21, a second laminated glass member 22 and the interlayer film 11. The interlayer film 11 is arranged between the first laminated glass member 21 and the second laminated glass member 22 to be sandwiched therebetween.

The first laminated glass member 21 is layered on a first surface 11a of the interlayer film 11. The second laminated glass member 22 is layered on a second surface 11b opposite to the first surface 11a of the interlayer film 11. The first laminated glass member 21 is layered on an outer surface 1a (a second surface opposite to a first surface 1b) of a first layer 1. The second laminated glass member 22 is layered on an outer surface 2a of a second layer 2.

Figure 4:
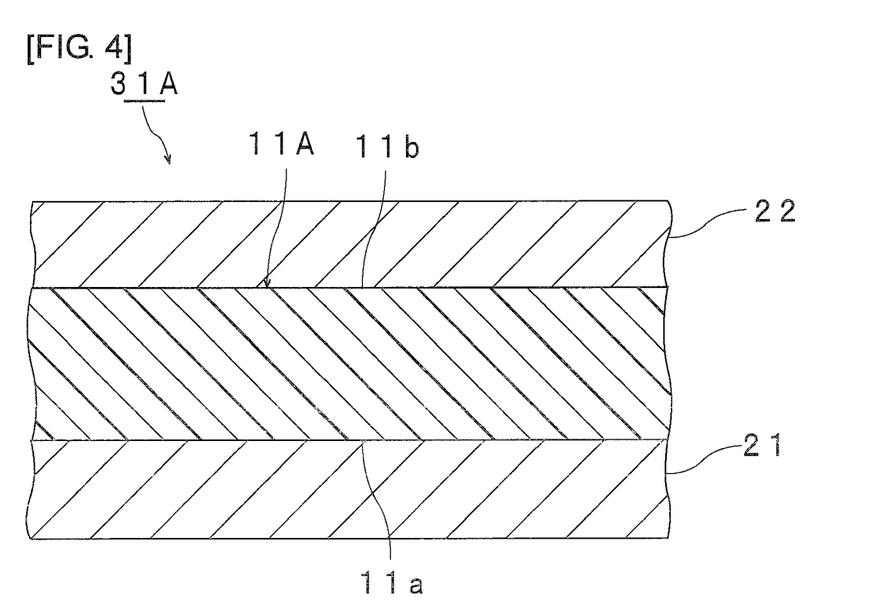
FIG. 4 is a sectional view schematically showing an example of laminated glass prepared with the interlayer film for laminated glass shown in FIG. 2.

FIG. 4 is a sectional view schematically showing an example of laminated glass prepared with the interlayer film for laminated glass shown in FIG. 2.

Laminated glass 31A shown in FIG. 4 is provided with a first laminated glass member 21, a second laminated glass member 22 and an interlayer film 11A. The interlayer film 11A is arranged between the first laminated glass member 21 and the second laminated glass member 22 to be sandwiched therebetween.

The first laminated glass member 21 is layered on a first surface 11a of the interlayer film 11A. The second laminated glass member 22 is layered on a second surface 11b opposite to the first surface 11a of the interlayer film 11A.

As described above, the laminated glass according to the present invention is provided with a first laminated glass member, a second laminated glass member and an interlayer film, and the interlayer film is the interlayer film for laminated glass according to the present invention. In the laminated glass according to the present invention, the above-mentioned interlayer film is arranged between the first laminated glass member and the second laminated glass member.

Examples of the laminated glass member include a glass plate, and a PET (polyethylene terephthalate) film. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used. It is preferred that the first laminated glass member be a glass plate or a PET film, the second laminated glass member be a glass plate or a PET film, and at least one among the first laminated glass member and the second laminated glass member be a glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, and wired plate glass. The organic glass is synthetic resin glass substituted for inorganic glass. Examples of the organic glass include a polycarbonate plate, and a poly(meth)acrylic resin plate. Examples of the poly(meth)acrylic resin plate include a polymethyl (meth)acrylate plate.

The thickness of the laminated glass member is preferably greater than or equal to 1 mm, preferably less than or equal to 5 mm and more preferably less than or equal to 3 mm. Moreover, in the case where the laminated glass member is a glass plate, the thickness of the glass plate is preferably greater than or equal to 1 mm, preferably less than or equal to 5 mm and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, an interlayer film is sandwiched between the first laminated glass member and the second laminated glass member, and the air remaining between the first laminated glass member and the interlayer film and between the second laminated glass member and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a third layer and a second layer may be layered.

The interlayer film and the laminated glass can be used for automobiles, railway vehicles, aircraft, ships, buildings and the like. The interlayer film and the laminated glass can also be used for applications other than these applications. It is preferred that the interlayer film and the laminated glass be an interlayer film and laminated glass for vehicles or for building, and it is more preferred that the interlayer film and the laminated glass be an interlayer film and laminated glass for vehicles. The interlayer film and the laminated glass can be used for a windshield, side glass, rear glass or roof glass of an automobile and the like. The interlayer film and the laminated glass are suitably used for automobiles. The interlayer film is used for obtaining laminated glass of an automobile.

Hereinafter, the present invention will be described in more detail with reference to examples. The present invention is not limited only to these examples.

The following materials were prepared.

(Thermoplastic Resin)

Polyvinyl acetal resin (PVB1) (a polyvinyl butyral resin obtained by acetalizing the polyvinyl alcohol having an average polymerization degree of 1700 with n-butyraldehyde, the content of the hydroxyl group of 30.8% by mole, the acetylation degree of 0.7% by mole, the acetalization degree (the butyralization degree) of 68.5% by mole)

In this connection, the content of the hydroxyl group, the acetylation degree and the acetalization degree (the butyralization degree) were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)

triethylene glycol di-2-ethylhexanoate (3GO)

(Ultraviolet Ray Shielding Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

H-BHT (2,6-di-t-butyl-4-methylphenol, "H-BHT" available from Sakai Chemical Industry Co., Ltd.)

(Metal Salt Containing Metal Element)

Mg mixture 1 (a 50:50 (weight ratio) mixture of magnesium 2-ethylbutyrate and magnesium acetate)

Magnesium 2-ethylbutyrate

Potassium acetate

EXAMPLE 1

Preparation of Composition for Forming First Layer:

One hundred parts by weight of a polyvinyl acetal resin (PVB1), 40 parts by weight of a plasticizer (3GO), 0.2 part by weight of an ultraviolet ray shielding agent (Tinuvin 326), 0.2 part by weight of an oxidation inhibitor (H-BHT) and an Mg mixture 1 in an amount that the metal element concentration (Mg concentration) becomes 70 ppm in the resulting interlayer film were thoroughly mixed with a mixing roll to obtain a composition for forming a first layer.

Preparation of Interlayer Film:

The composition for forming a first layer was extruded under the condition of allowing the gauge pressure of vacuum venting (the vent pressure) to be 520 mmHg using a vent type extruder to prepare a single-layered interlayer film (760 μm in thickness) composed only of a first layer (760 μm in thickness).

Preparation of Laminated Glass for Evaluation of Adhesive Force:

Two washed and dried sheets of transparent float glass (15 cm in longitudinal length×15 cm in transversal length×2.5 mm in thickness) were prepared. The obtained interlayer film was sandwiched between the two glass plates to obtain a laminate. The obtained laminate was put into a bag, and the inside of the vacuum bag was degassed at a degree of vacuum of 933.2 hPa and at ordinary temperature (23° C.). Subsequently, the temperature in the vacuum bag was elevated to 100° C. while maintaining the degassed state, and after the temperature reached 100° C., the laminate was held for 20 minutes. Afterward, the vacuum bag was allowed to spontaneously cool, and it was confirmed that the temperature was lowered to 30° C., after which the pressure was released to the atmosphere.

The laminated glass preliminarily press-bonded by the above-mentioned vacuum bag method was press-bonded for 20 minutes under conditions of 135° C. and a pressure of 1.2 MPa using an autoclave to obtain a sheet of laminated glass.

EXAMPLES 2 TO 3 AND COMPARATIVE EXAMPLE 1

An interlayer film and a sheet of laminated glass were obtained in the same manner as that in Example 1 except that the kind of ingredients to be blended for the composition for forming a first layer and the content thereof were set to those listed in the following Table 2 and the vent pressure at the time of manufacturing the interlayer film was set to that listed in the following Table 2.

EXAMPLES 4 TO 11 AND COMPARATIVE EXAMPLE 2

An interlayer film was obtained in the same manner as that in Example 1 except that the kind of ingredients to be blended for the composition for forming a first layer and the content thereof were set to those listed in the following Table 3 and the vent pressure at the time of manufacturing the interlayer film was set to that listed in the following Table 3.

Preparation of Interlayer Film for Measurement of Contact Angle:

Two sheets of PET films ("Lumirror T60" available from Toray Industries, Inc., 15 cm in longitudinal length×15 cm in transversal length×100 μm in thickness) and two washed and dried sheets of transparent float glass (15 cm in longitudinal length×15 cm in transversal length×2.5 mm in thickness) were prepared. Two sheets of PET films were sandwiched between two sheets of glass plates, and furthermore, the obtained interlayer film was interposedly arranged between the two sheets of PET films to obtain a laminate. The obtained laminate has a layered structure with a stack of a glass plate/a PET film/an interlayer film/a PET film/a glass plate. The obtained laminate was put into a bag, and the inside of the vacuum bag was degassed at a degree of vacuum of 933.2 hPa and at ordinary temperature (23° C.). Subsequently, the temperature in the vacuum bag was elevated to 100° C. while maintaining the degassed state, and after the temperature reached 100° C., the laminate was held for 20 minutes. Afterward, the vacuum bag was allowed to spontaneously cool, and it was confirmed that the temperature was lowered to 30° C., after which the pressure was released to the atmosphere.

The laminated glass preliminarily press-bonded by the above-mentioned vacuum bag method was held for 20 minutes under conditions of 135° C. and a pressure of 1.2 MPa using an autoclave to obtain an interlayer film with smoothed surfaces formed by virtue of the PET films.

(Evaluation)

(1) Measurement of Contact Angle (Measurement Environment) Temperature 23° C., Relative Humidity 50%

(Measurement method) Diiodomethane or ethylene glycol was contained in a syringe, and a 2.0-μL liquid droplet was prepared so as to be positioned at the needle tip. The prepared liquid droplet was brought into contact with the surface of an interlayer film to arrange the liquid droplet on the interlayer film. In this context, in Examples 4 to 11 and Comparative Example 2, a prepared liquid droplet was brought into contact with the exposed surface of an interlayer film from which a PET film was peeled off. At the end of 1 second after the liquid droplet was arranged on the interlayer film, an image of the liquid droplet was photographed. This image of the liquid droplet was analyzed to calculate a contact angle by a θ/2 method. An average value of 10 measured values was defined as the contact angle. In this connection, the interlayer film was allowed to stand for 24 hours under the measurement environment before measurement.

As a measuring apparatus, "Drop Master 500" available from Kyowa Interface Science Co., Ltd. was used.

(2) Haze After Immersion

The interlayer film, which was used for the measurement of the contact angle, was immersed in ion-exchanged water at 23° C. for 10 hours, pulled up therefrom to wipe off water, and measured for the haze value in accordance with JIS K6714 using a haze meter ("TC-H III DPK" available from Tokyo Denshoku Co., Ltd.). The measurement was performed two times, and an average value of 2 measured values was defined as the value of haze after immersion.

(3) Adhesive Force (Pummel)

The obtained sheet of laminated glass was stored at −18° C.±0.6° C. for 16 hours. The center part (the area of 15 cm in longitudinal length×15 cm in transversal length) of the sheet of laminated glass after storage was struck and broken by a hammer with a head of 0.45 kg until broken pieces of glass were allowed to have a particle diameter less than or equal to 6 mm. The center part (the area of 15 cm in longitudinal length×15 cm in transversal length) of the sheet of laminated glass was broken, after which the degree of exposure of the interlayer film (% by area) was measured to determine the pummel value according to the following Table 1. An average value of 6 measured values was adopted as the pummel value.

TABLE 1

| Degree of exposure of interlayer film (% by area) | Pummel value |
| --- | --- |
| 90 < Degree of exposure ≤ 100 | 1 |
| 85 < Degree of exposure ≤ 90 | 2 |
| 60 < Degree of exposure ≤ 85 | 3 |
| 40 < Degree of exposure ≤ 60 | 4 |
| 20 < Degree of exposure ≤ 40 | 5 |
| 10 < Degree of exposure ≤ 20 | 6 |
| 5 < Degree of exposure ≤ 10 | 7 |
| 2 < Degree of exposure ≤ 5 | 8 |
| Degree of exposure ≤ 2 | 9 |

The details and the results are shown in the following Tables 2 and 3.

TABLE 2

| | Composition of interlayer film (first layer) | | | | | | | | | Production condition |
| --- | --- | --- | --- | --- | --- | --- | --- | --- | --- | --- |
| | Thermoplastic resin | | Plasticizer | | Ultraviolet ray absorber | | Oxidation inhibitor | | Metal element | Vent |
| | Kind | Content Part(s) by weight | Kind | Content Part(s) by weight | Kind | Content Part(s) by weight | Kind | Content Part(s) by weight | Kind | Content ppm | pressure mmHg |
| Ex. 1 | PVB1 | 100 | 3GO | 40 | Tinuvin326 | 0.2 | H-BHT | 0.2 | Mg mixture 1 | 70 | 520 |
| Ex. 2 | PVB1 | 100 | 3GO | 40 | Tinuvin326 | 0.2 | H-BHT | 0.2 | Mg mixture 1 | 80 | 700 |
| Ex. 3 | PVB1 | 100 | 3GO | 40 | Tinuvin326 | 0.2 | H-BHT | 0.2 | Mg mixture 1 | 55 | 700 |
| Comp. Ex. 1 | PVB1 | 100 | 3GO | 40 | Tinuvin326 | 0.2 | H-BHT | 0.2 | Mg mixture 1 | 70 | 150 |

| | Contact angle | | | |
| --- | --- | --- | --- | --- |
| | Diiodomethane ° | Ethylene glycol ° | Haze after immersion % | Adhesive force Pummel value |
| Ex. 1 | 42.1 | 57.4 | 77 | 3.3 |
| Ex. 2 | 41.5 | 61.9 | 44 | 2.5 |
| Ex. 3 | 40.6 | 59.5 | 38 | 5.5 |
| Comp. Ex. 1 | 40.1 | 54.2 | 82 | 9.0 |

TABLE 3

| | Composition of interlayer film (first layer) | | | | | | | | | | | Production |
|---|---|---|---|---|---|---|---|---|---|---|---|---|
| | Thermoplastic resin | | Plasticizer | | Ultraviolet ray absorber | | Oxidation inhibitor | | Metal element 1 | | Metal element 2 | | condition Vent |
| | Kind | Content Part(s) by weight | Kind | Content Part(s) by weight | Kind | Content Part(s) by weight | Kind | Content Part(s) by weight | Kind | Content ppm | Kind | Content ppm | pressure mmHg |
| Ex. 4 | PVB1 | 100 | 3GO | 40 | Tinuvin326 | 0.2 | H-BHT | 0.2 | Mg mixture 1 | 70 | | | 520 |
| Ex. 5 | PVB1 | 100 | 3GO | 40 | Tinuvin326 | 0.2 | H-BHT | 0.2 | Mg mixture 1 | 80 | | | 700 |
| Ex. 6 | PVB1 | 100 | 3GO | 40 | Tinuvin326 | 0.2 | H-BHT | 0.2 | Mg mixture 1 | 55 | | | 700 |
| Ex. 7 | PVB1 | 100 | 3GO | 40 | Tinuvin326 | 0.2 | H-BHT | 0.2 | Mg mixture 1 | 50 | | | 700 |
| Ex. 8 | PVB1 | 100 | 3GO | 40 | Tinuvin326 | 0.2 | H-BHT | 0.2 | Magnesium 2-ethylbutyrate | 25 | Potassium acetate | 60 | 700 |
| Ex. 9 | PVB1 | 100 | 3GO | 40 | Tinuvin326 | 0.2 | H-BHT | 0.2 | Mg mixture 1 | 41 | | | 700 |
| Ex. 10 | PVB1 | 100 | 3GO | 40 | Tinuvin326 | 0.2 | H-BHT | 0.2 | Mg mixture 1 | 47 | | | 700 |
| Ex. 11 | PVB1 | 100 | 3GO | 40 | Tinuvin326 | 0.2 | H-BHT | 0.2 | Mg mixture 1 | 75 | | | 700 |
| Comp. Ex. 2 | PVB1 | 100 | 3GO | 40 | Tinuvin326 | 0.2 | H-BHT | 0.2 | — | 0 | | | 700 |

| | Contact angle | | Haze after immersion | Adhesive force |
|---|---|---|---|---|
| | Diiodomethane ° | Ethylene glycol ° | % | Pummel value |
| Ex. 4 | 42.1 | 57.4 | 77 | 3.3 |
| Ex. 5 | 41.5 | 61.9 | 44 | 2.5 |
| Ex. 6 | 40.6 | 59.5 | 38 | 5.5 |
| Ex. 7 | 40.4 | 58.8 | 49 | 5.0 |
| Ex. 8 | 42.4 | 56.9 | 54 | 6.0 |
| Ex. 9 | 40.2 | 54.9 | 33 | 5.0 |
| Ex. 10 | 41.8 | 55.6 | 36 | 3.3 |
| Ex. 11 | 41.3 | 55.0 | 65 | 2.5 |
| Comp. Ex. 2 | 37.9 | 53.4 | 21 | 9.0 |

In this connection, specific examples of the interlayer film for laminated glass with a one-layer structure were described. Also in the case of the interlayer film for laminated glass with a two or more-layer structure, as in the case of the interlayer film for laminated glass with a one-layer structure, it was confirmed that the effect of the present invention is attained as long as the first layer is provided with the above-described constitution. Moreover, it was confirmed that the effect of the present invention is further effectively attained by allowing the first layer to have the above-described constitution, and furthermore, controlling the contact angle on the surface of the second layer as described above.

EXPLANATION OF SYMBOLS

1: First layer
1a: Outer surface (second surface)
1b: First surface
2: Second layer
2a: Outer surface
3: Third layer
3a: First surface
3b: Second surface
11: Interlayer film
11A: Interlayer film (first layer)
11a: First surface
11b: Second surface
21: First laminated glass member
22: Second laminated glass member
31: Laminated glass
31A: Laminated glass

The invention claimed is:

1. An interlayer film for laminated glass, having a two or more-layer structure,
being provided with a first layer containing a polyvinyl acetal resin, a plasticizer and a metal element as a surface layer thereof, the first layer being a first layer having a contact angle of greater than 40.1° when measured by a sessile drop method using diiodomethane or a first layer having a contact angle of greater than 54.2° when measured by a sessile drop method using ethylene glycol, and the first layer being obtained by using a vent type extruder and by being extruded under the condition of the gauge pressure of vacuum venting of higher than or equal to 500 mmHg.

2. The interlayer film for laminated glass according to claim 1, wherein the content of the metal element in the first layer is greater than or equal to 20 ppm and less than or equal to 200 ppm.

3. The interlayer film for laminated glass according to claim 1, wherein the first layer contains the metal element as a metal element derived from an alkali metal salt or an alkaline earth metal salt added thereto.

4. The interlayer film for laminated glass according to claim 1, wherein the metal element is a polyvalent metal element.

5. The interlayer film for laminated glass according to claim 1, wherein the first layer contains the metal element as a metal element derived from magnesium acetate or magnesium 2-ethylbutyrate added thereto.

6. The interlayer film for laminated glass according to claim 1, wherein the interlayer film is provided with a second layer containing a thermoplastic resin and a plasticizer as a surface layer of the interlayer film, and the second layer is arranged on a first surface side of the first layer.

7. The interlayer film for laminated glass according to claim 6, wherein the second layer contains a metal element, and the second layer is a second layer having a contact angle of greater than 40.1° when measured by a sessile drop method using diiodomethane or a second layer having a contact angle of greater than 54.2° when measured by a sessile drop method using ethylene glycol.

8. The interlayer film for laminated glass according to claim 6, wherein the interlayer film has a three or more-layer structure and is further provided with a third layer containing a thermoplastic resin and a plasticizer, and the third layer is arranged between the first layer and the second layer.

9. The interlayer film for laminated glass according to claim 8, wherein the thermoplastic resin contained in the second layer is a polyvinyl acetal resin, and the thermoplastic resin contained in the third layer is a polyvinyl acetal resin.

10. The interlayer film for laminated glass according to claim 6, wherein the thermoplastic resin contained in the second layer is a polyvinyl acetal resin.

11. The interlayer film for laminated glass according to claim 1, wherein the first layer is a first layer having a contact angle of greater than or equal to 41.2° when measured by a sessile drop method using diiodomethane and a first layer having a contact angle of greater than or equal to 57.4° when measured by a sessile drop method using ethylene glycol.

12. The interlayer film for laminated glass according to claim 1, wherein a content of the metal element in the first layer is greater than or equal to 20 ppm and less than or equal to 200 ppm, and the first layer comprises magnesium of less than or equal to 100 ppm.

13. The interlayer film for laminated glass according to claim 1, wherein the first layer is a first layer having a contact angle of greater than or equal to 41.2° when measured by a sessile drop method using diiodomethane and a first layer having a contact angle of greater than or equal to 57.4° when measured by a sessile drop method using ethylene glycol, a content of the metal element in the first layer is greater than or equal to 20 ppm and less than or equal to 200 ppm, and the first layer comprises magnesium of less than or equal to 100 ppm.

14. The interlayer film for laminated glass according to claim 1, wherein the first layer is a first layer having a contact angle of 40.2° or greater and 42.4° or less when measured by a sessile drop method using diiodomethane or a first layer having a contact angle of 54.9° or greater and 61.9° or less when measured by a sessile drop method using ethylene glycol.

15. The interlayer film for laminated glass according to claim 1, further comprising at least one of a phenol-based oxidation inhibitor and a phosphorous-based oxidation inhibitor.

16. The interlayer film for laminated glass according to claim 1, further comprising a metal-based ultraviolet ray shielding absorber that does not contain heat shielding particles and that comprises at least one selected from the group consisting of platinum particles, particles in which the surface of platinum particles is coated with silica, palladium particles, and particles in which the surface of palladium particles is coated with silica.

17. A method for manufacturing the interlayer film for laminated glass according to claim 1, comprising the step of obtaining the first layer by using a vent type extruder and by being extruded under the condition of the gauge pressure of vacuum venting of higher than or equal to 500 mmHg.

18. A laminated glass, comprising a first laminated glass member, a second laminated glass member and the interlayer film for laminated glass according to claim 1, wherein the interlayer film for laminated glass is arranged between the first glass member and the second glass member.

* * * * *